United States Patent [19]
Kent

[11] Patent Number: 5,222,142
[45] Date of Patent: Jun. 22, 1993

[54] SEQUENCE GENERATOR

[75] Inventor: Bruce C. Kent, Long Beach, Calif.

[73] Assignee: Hughes Aircraft Company, Los Angeles, Calif.

[21] Appl. No.: 903,057

[22] Filed: Jun. 22, 1992

[51] Int. Cl.⁵ .............................................. H04L 9/00
[52] U.S. Cl. ................................. 380/46; 364/224.21; 364/717
[58] Field of Search ............... 380/46, 50; 364/224.21, 364/717

[56] References Cited

U.S. PATENT DOCUMENTS

| | | | |
|---|---|---|---|
| 3,582,882 | 6/1971 | Titcomb | 364/717 |
| 3,946,215 | 3/1976 | May | 364/717 |
| 4,348,597 | 9/1982 | Weber | 364/717 |
| 4,495,560 | 1/1985 | Sugimoto et al. | 364/717 |
| 4,771,429 | 9/1988 | Davis et al. | 380/46 |
| 4,903,266 | 2/1990 | Hack | 364/717 |
| 4,905,176 | 2/1990 | Schulz | 380/46 |
| 5,079,733 | 1/1992 | Antoine et al. | 364/717 |

*Primary Examiner*—David Cain
*Attorney, Agent, or Firm*—Gordon R. Lindeen, III; Wanda Denson-Low

[57] ABSTRACT

An improved sequence generator. The inventive generator (10) is adapted for use with a source (12) for providing successive bits of random data. The invention (10) includes a shift register (18) with a feedback loop. The shift register (18) stores bits of random data. Input to the shift register (18) is determined by a switch (16) which selects between the random data source (12), in a first mode of operation, and the feedback loop, in a second mode of operation. A control logic circuit (20) triggers the switch from the second mode to the first mode, for one clock cycle, as the random data source (12) provides a each successive bit of random data. Thus, optimum performance is obtained without the need to gate clock signals or to control the operation of the shift register.

26 Claims, 4 Drawing Sheets

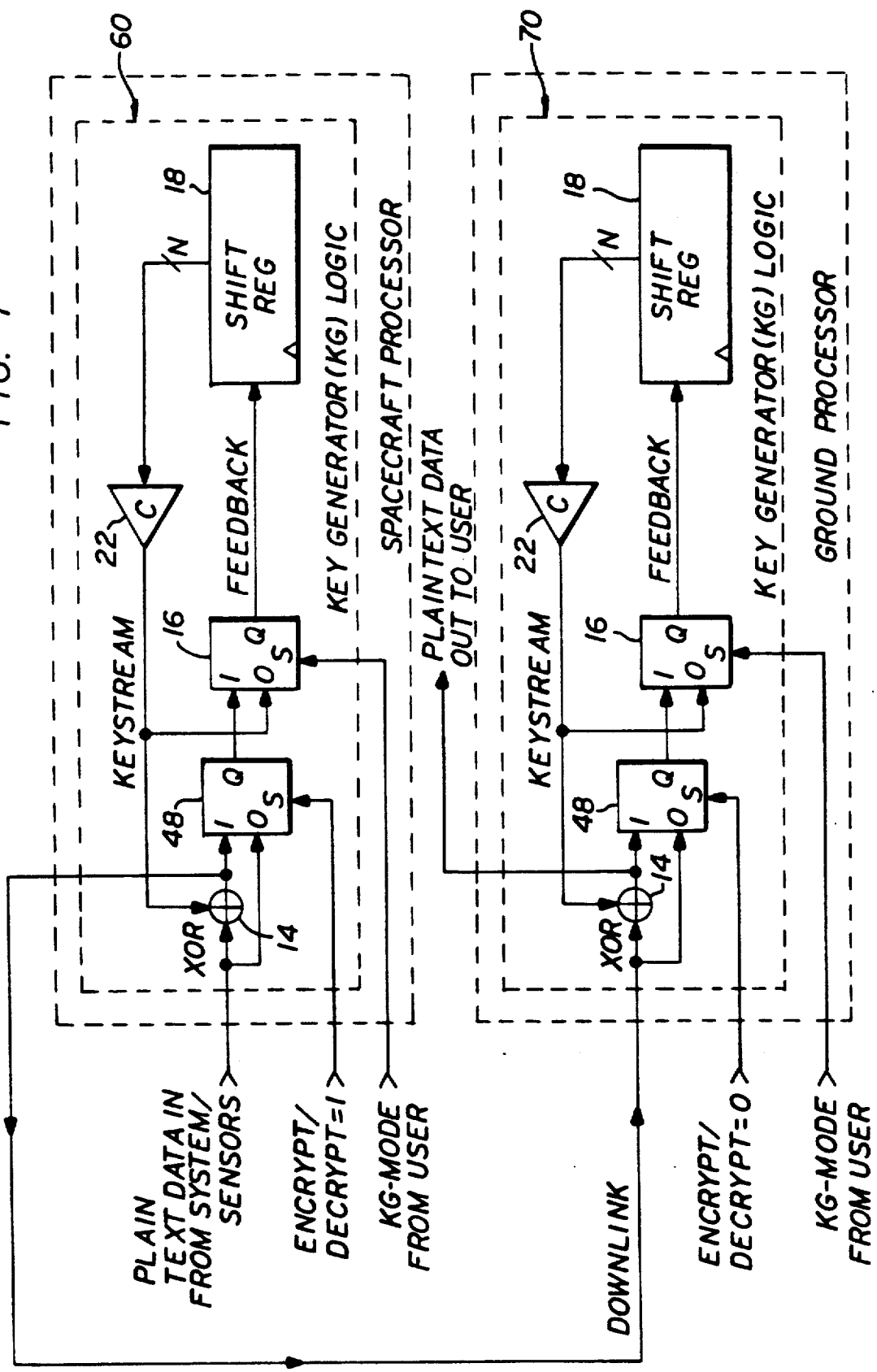

5,222,142

SEQUENCE GENERATOR

BACKGROUND OF THE INVENTION

1. Field of the Invention

The present invention relates to communication systems. More specifically, the present invention relates to data encryption and decryption devices used in secure communication systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Numerous data encryption and decryption schemes are known and used in the art to protect "secure" voice and data communication channels from unauthorized intrusion and detection. Encryptors implement frequency hopping, spread spectrum and other schemes to secure the communications link.

Encryption and decryption typically involve the use of a sequence generator to provide a random or pseudo-random sequence of data bits which are used to control the frequency hopping, spectrum spreading or other security scheme of the system.

Sequence generators generally include a random data source the output of which is gated into a shift register as some function of the data stored therein. A switch is activated by control logic. Through the switch, the control logic clocks random data into the shift register, in accordance with the random data bit rate, until a given number of random bit words have been input. At this point, the switch is activated and a function of the random data bits stored in the shift register is fed back to the shift register through the switch. This feedback also constitutes the output of the sequence generator. The output sequence is used to encrypt/decrypt data in a transmitter/receiver or used to control the frequency hopping, spectrum spreading or other security scheme thereof.

For improved security, the state of the encryptor should be "randomized" prior to use. Randomization is typically achieved with a random bit stream from the external, low rate, random data source to establish a random state starting point within the sequence generator.

Unfortunately, the speed of the sequence generator is currently limited by the rate at which the random data source outputs random bits, a rate which is generally substantially lower than the clock rate of the processor in the control logic. As a result, the sequence generator must be slowed to a rate appropriate for the random data source. Two methods are currently used to disable the sequence generator: 1) either the system clock is slowed or 2) the shift register is disabled.

Clock disabling or gating is considered to be a poor design practice due to the multitude of timing and test problems which can be created. Improper timing resulting from the use of gated clock signals can generate a false clock signal and cause a flip-flop to clock in incorrect data.

In addition to improper timing problems, the use of gated clock signals can cause problems for the scan chain based testing and fault grading techniques widely applied in current VLSI design.

The second method of slowing the sequence generator involves the addition of a hold mode to every flip-flop within the shift register of the sequence generator. The shift register includes a series of flip-flops. When implemented without a disable mode, the output of one flip-flop is input to the next and a high operational speed is achieved. When implemented with a disable mode, a 2:1 multiplexer is added to the input of each flip-flop. One multiplexer input is driven by the line that would normally connect to the flip-flop input while the other multiplexer input is driven the flip-flop output. The output of the multiplexer is connected to the flip-flop input. Each of the multiplexers is controlled by a common, high fan out "enable" or "disable" signal. While feasible for moderate speed designs, this approach is unacceptable for high speed designs. Multiplexers add delay to critical paths and reduce maximum operational speeds. High speed, high fan out signals are difficult to implement. The additional gates required for multiplexers and for the disable control distribution increase device sizes which reduces device speed.

Thus, although adding a disable mode to the sequence generator is a more acceptable design approach, this approach increases gate/parts counts, increases power consumption, increases device complexity, adds delay to critical paths within the sequence generator, and thereby reduces performance limits.

Accordingly, there is a need in the art for a technique for achieving randomization of encryptor systems without suffering the performance degradation normally associated with a disabling of the system clock or the shift register of the sequence generator.

SUMMARY OF THE INVENTION

The need in the art is addressed by the present invention which provides an improved sequence generator. The inventive generator is adapted for use with a source for providing successive bits of random data. The invention includes a shift register with a feedback loop. The shift register stores bits of random data. Input to the shift register is determined by a switch which selects between the random data source, in a first mode of operation, and the feedback loop, in a second mode of operation. A control logic circuit triggers the switch from the second mode to the first mode as the source provides a each successive bit of random data. Thus, optimum performance is obtained without the need to gate clock signals or to control the operation of the shift register.

BRIEF DESCRIPTION OF THE DRAWINGS

FIG. 7 shows an illustrative implementation of a technique for synchronizing an encrypting subsystem (key generator logic) in a spacecraft processor with an identical decrypting subsystem (key generator logic) in a ground based processor.

DESCRIPTION OF THE INVENTION

Illustrative embodiments and exemplary applications will now be described with reference to the accompanying drawings to disclose the advantageous teachings of the present invention.

Figure 1:
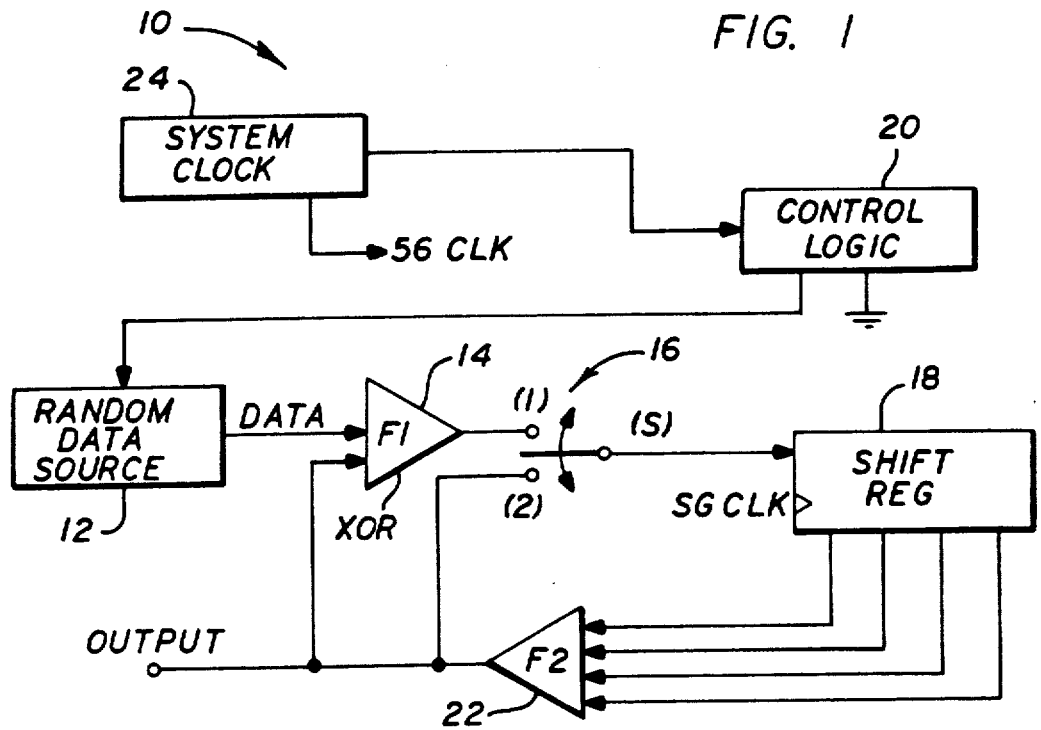
FIG. 1 is a block diagram of the improved sequence generator of the present invention.

FIG. 1 is a block diagram of the improved sequence generator 10 of the present invention. The inventive generator 10 includes a random data source 12 which provides random output data in accordance with a first predetermined clock rate. The random data source is of conventional design and typically includes a pin diode which generates a random output signal which is stored in a buffer. The typical conventional random data source provides random data at a rate which is relatively slow. The output of the random data source is input to a shift register 18 through a first function generator 14 and a switch 16.

The switch 16 may be implemented with a conventional electronic switch. The switch 16 operates under control of a control logic circuit 20. The control logic 20 operates the switch between a first position (in a first mode of operation) at which the output of the random data source is provided to the shift register 18 and a second position (and a second mode of operation) at which a function of selected outputs of the shift register 18 is fed back to the input thereof. The shift register outputs are fed back through a second function generator 22. The output of the second function generator 22 may also be provided as a second input to the first function generator 14.

The first function generator 14 may be an OR gate, an AND gate, a NOR gate, an XOR gate or a circuit providing any other function appropriate for the application as may be appreciated by those skilled in the art. Similarly, the second function generator 22 may be an OR gate, an AND gate, a NOR gate, an XOR gate or a circuit providing any other function appropriate for the application as may be appreciated by those skilled in the art.

As mentioned above, in conventional sequence generators, the clock rate of the control logic and shift register are generally much higher than that of the random data source. Accordingly, the clock must be gated into the shift register to slow the operation thereof down to the rate of the random data source or the operation of the shift register must be controlled with enable and disable signals. Again, the gating of the system clock is considered a poor design practice in that it allows for improper timing within the system. Controlling the shift register requires a more costly, more complicated and slower shift register with associated enable control lines, multiplexers and etc. This is illustrated in FIGS. 2 and 3 below.

Figure 2:
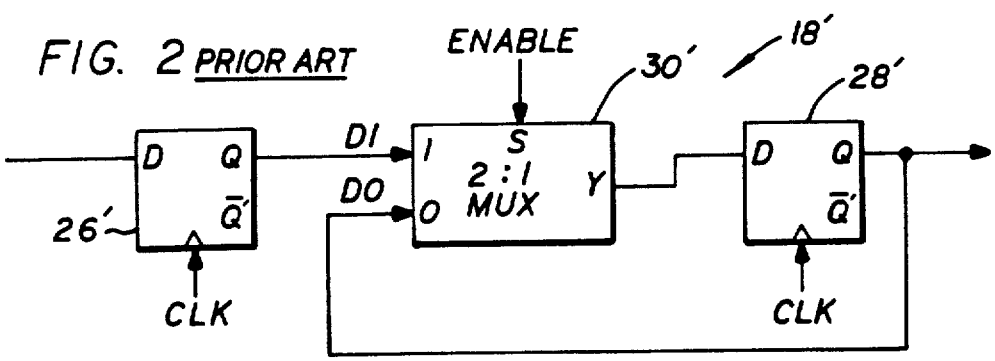
FIG. 2 is a simplified block diagram of an illustrative portion of a conventional shift register for a sequence generator.

FIG. 2 is a simplified block diagram of an illustrative portion of a shift register 18' for a conventional sequence generator.

Figure 3:
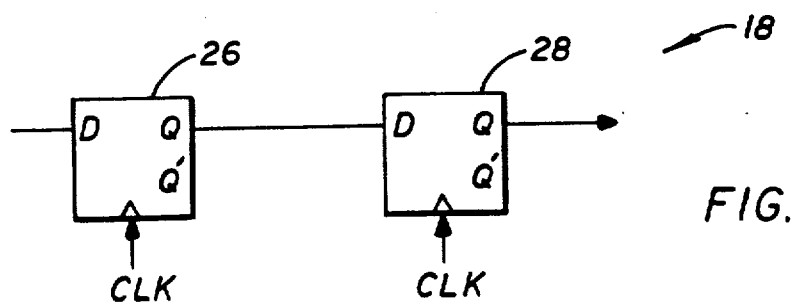
FIG. 3 is a simplified block diagram of an illustrative portion of a shift register for the sequence generator of the present invention.

FIG. 3 is a simplified block diagram of an illustrative portion of a shift register 18 for the sequence generator 10 of the present invention.

As shown in FIG. 2 in a conventional sequence generator, the shift register 18' includes a number of flip-flops 26', 28' having a D input terminal Q and Q' output terminals and a clock terminal and a 2:1 multiplexer 30' between cascaded flip-flops. The multiplexer 30' has a first input terminal connected to the output of the first flip-flop 26' and a second input terminal connected to the output of the second flip-flop 28'. The output of the multiplexer 30' is connected to the input terminal of the second flip-flop 28'. An enable signal is provided by a control circuit (not shown). The multiplexer 30' is enabled to control the operation of the shift register 18' to match the output rate of a random data source without gating the system clock. As mentioned above, controlling the shift register 18' in this manner requires a more costly, more complicated and slower shift register with associated enable control lines, multiplexers and etc. than that afforded by the present teachings.

As illustrated in FIG. 3, the present invention allows for the use of a simple, fast and inexpensive shift register design and obviates the necessity for enable lines and other associated circuitry. Hence, the simplified shift register 18 of the present system includes a plurality of flip-flops which are directly connected as shown in FIG. 3.

Figure 4:
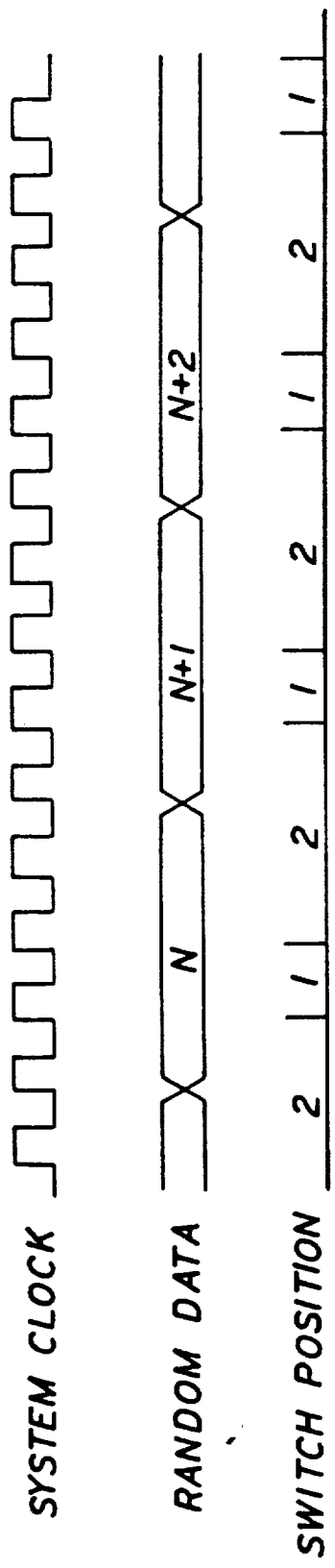
FIG. 4 is a timing diagram of the improved sequence generator of the present invention.

Returning to FIG. 1, this advantageous operation is provided by the control logic circuit 20 which triggers the switch 16 from the second mode to the first mode as the random data source 12 provides a each successive bit of random data. This is illustrated in the timing diagram of FIG. 4 which shows the switch position transitions from position 2 to position 1 when a new bit of random data is provided by the random data source 12. The system clock is shown to indicate the relatively high rate thereof. In a typical implementation, the system clock rate may be on the order of 100 times faster than the rate at which the random data source is clocked.

Figure 5:
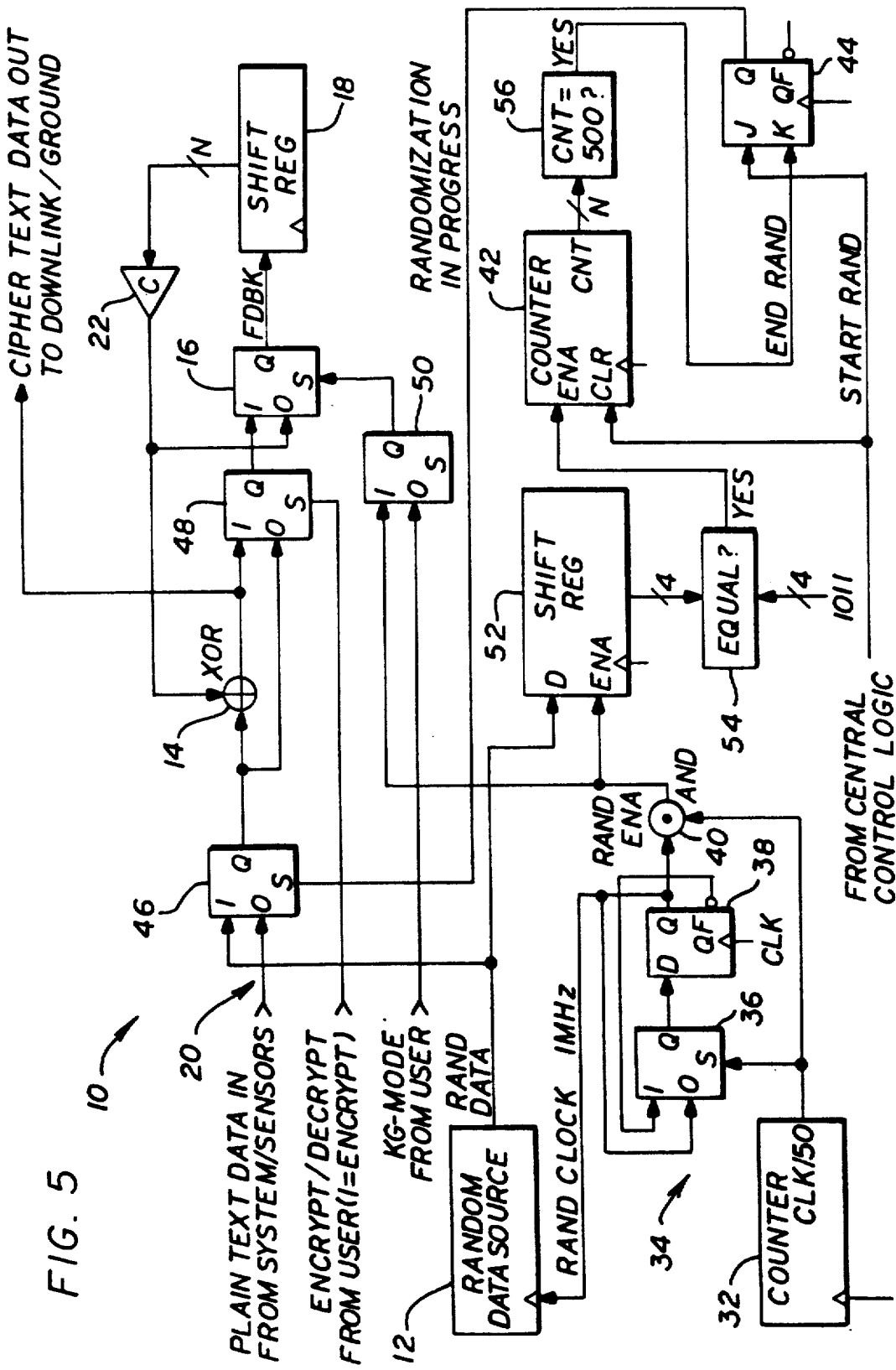
FIG. 5 is a detailed block diagram of an illustrative implementation of the sequence generator of the present invention.
Figure 6:
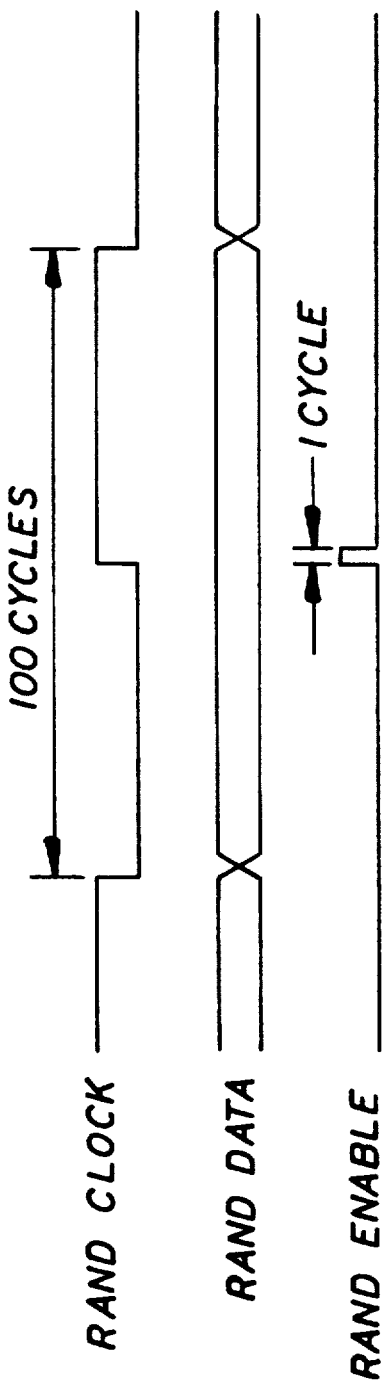
FIG. 6 is a second timing diagram of the improved sequence generator of the present invention.

FIG. 5 is a detailed block diagram of an illustrative implementation of the sequence generator 10 of the present invention. FIG. 5 shows the control logic circuitry along with the random data source 12, the first function generator 14, the switch 16, the shift register 18, and the second function generator 22. The control logic 20 includes a counter 32 which divides the system clock by 50, for example. The output of the counter 32 drives the enable input of a toggle flip-flop 34 implemented by a multiplexer 36 and a flip-flop 38. This circuit produces a clock signal "RAND-CLOCK" for the random data source 12 and an enable signal "RAND-ENABLE" for the switch 16. These signals are illustrated in the second timing diagram of FIG. 6.

The randomization process is started by a signal "START RAND" which is generated by conventional central control logic of the host communication system (not shown). This signal clears a pattern-match counter 42 and sets a randomization-in-progress JK flip-flop 44 to a "1". While randomization is in progress, random data from the source 12 is supplied as input to the shift register 18 via the first function generator 14, an exclusive-or (XOR) gate and two multiplexer switches 46 and 48 and the switch 16. While randomization is in progress, the mode of the switch 16 is determined by the RAND-ENABLE signal.

During randomization, for 99 out of 100 clock cycles, the switch 16 is in position 2 (mode 2) where its feedback is solely determined by the output of the second function generator (combiner) 22. Every 100 cycles, the mode of the system is switched to mode 1 for one cycle such that its feedback is a function of random data solely or in combination with the combiner output as a function of the ENCRYPT/DECRYPT control input provided by the user.

As random data bits are shifted into the shift register 18, these bits are also shifted into a four bit shift register 52. The contents of the shift register 52 are compared to an arbitrary fixed pattern such as "1011" by a comparator 54. The pattern-match counter 42 is enabled once each time a match is detected. After a predetermined number of matches (e.g., 500) have been detected by a comparator 56, the randomization is considered complete, an END RAND signal is generated, clearing the JK flip-flop 44 and returning control of the logic mode and data input to the user via the multiplexer switches 46 and 50.

Upon completion of the randomization process, the state of the shift register 18 is a function of its initial state (at the start of the randomization process) and the random data supplied by the source 12. The state of the shift register is therefore random.

FIG. 7 shows an illustrative implementation of a technique for synchronizing an encrypting subsystem (key generator logic) 60 in a spacecraft processor with an identical decrypting subsystem (key generator logic) 70 in a ground based processor. Logic which is only active during randomization has been removed for clarity. The synchronization process occurs after the spacecraft encrypting system 60 has been randomized. The system 60 on the spacecraft is always encrypting and the system 70 on the ground is always decrypting.

The subsystem 60 on the spacecraft is forced into a mode whereby the feedback to the shift register 18 is a function of PLAIN TEXT DATA IN (from the host system or sensors) and the output of the first function generator 22. Note that the downlink stream is equal to the spacecraft's feedback stream which is equal to the exclusive or (XOR) of the plain text and the output of the function generator 22.

The subsystem 70 in the ground based processor 70 is forced to a mode whereby feedback to the shift register 18 equals DATA IN as is input to the XOR gate 14 of the spacecraft encrypting subsystem 60. Since the ground and spacecraft shift registers 18 are being supplied the same feedback as input, the function generators 22 are producing the same KEYSTREAM output. Thus, PLAIN TEXT DATA which is encrypted on the spacecraft is properly decrypted on the ground. That is:

PLAIN-TEXT XOR KEYSTREAM XOR
KEYSTREAM = PLAIN TEXT

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An improved sequence generator for use with a source of successive bits of random data, said improved sequence generator comprising:

shift register means for storing said bits of data, said shift register means having a feedback loop;

switch means for selecting between said source means, in a first mode of operation, and said feedback loop, in a second mode of operation, for input to said shift register means; and control logic means for switching said switch means from said second mode to said first mode as said source means provides a each successive bit of random data.

2. The invention of claim 1 wherein said feedback loop includes first function means for providing a function of the data bits stored in said shift register means.

3. The invention of claim 2 including second function means for providing a function of the output of said source means and the output of said first function means.

4. The invention of claim 3 wherein said switch means switches between the output of said first function means in said second mode to the output of said second function means in said first mode.

5. The invention of claim 1 wherein said shift register means includes a shift register consisting essentially of cascaded flip-flop circuits.

6. An improved sequence generator for use with an encryption system comprising:

source means for providing successive bits of random data;

shift register means for storing said bits of data, said shift register means having a feedback loop, said shift register means including a shift register consisting essentially of cascaded flip-flop circuits;

switch means for selecting between said source means, in a first mode of operation, and said feedback loop, in a second mode of operation, for input to said shift register means;

first function means disposed in said feedback loop for providing a function of the data bits stored in said shift register;

second function means for providing a function of the output of said source means and the output of said first function means; and control logic means for switching said switch means from said second mode to said first mode as said source means provides a each successive bit of random data, said control logic means switching switch means between the output of said first function means in said second mode to the output of said second function means in said first mode.

7. An improved method of randomizing an encryption circuit including the steps of:

providing successive bits of random data;

storing the bits of random data in a shift register having a feedback loop;

selecting either the bits of random data, in a first mode of operation, or the feedback loop, in a second mode of operation, for input to the shift register; and selecting the first mode of operation as each successive bit of random data is provided and otherwise operating in said second mode.

8. The invention of claim 7 wherein said step of selecting said feedback loop includes selecting a function of the data bits stored in said shift register for input to the shift register.

9. The invention of claim 8 wherein said step of selecting the bits of random data includes selecting a function of the successive bits of random data and the output of said first function for input to the shift register.

10. A sequence generator for use with a source of successive bits of random data, said sequence generator comprising:
   a shift register for storing said bits of random data, said shift register having a feedback loop;
   a switch for selecting between said random data source in a first mode of operation, and said feedback loop, in a second mode of operation, for input to said shift register;
   control logic for switching said switch between said second mode and said first mode; and
   an output port for providing a sequence of bits from the contents of said shift register.

11. The invention of claim 10 wherein said feedback loop includes a first function generator for providing a first function of the data bits stored in said shift register for input to said shift register.

12. The invention of claim 11 wherein said first function generator includes a logic gate and said first function includes a logic function.

13. The invention of claim 12 wherein said logic gate includes an Exclusive or (XOR) gate and said logic function includes an Exclusive or (XOR) function.

14. The invention of claim 11 including a second function generator for providing a second function of the output of said random data source together with the output of said first function generator for input to said shift register.

15. The invention of claim 14 wherein said second function generator includes a logic gate and said second function includes a logic function.

16. The invention of claim 14 wherein said switch switches between the output of said first function generator in said second mode to the output of said second function generator in said first mode.

17. The invention of claim 10 wherein said control logic switches said switch from said second mode to said first mode as each successive bit is provided from said random data source.

18. The invention of claim 17 wherein said control logic maintains said switch normally switched to said second mode.

19. The invention of claim 10 wherein said output port provides bits at a faster rate than said random data source.

20. The invention of claim 14 wherein said output port provides the bits provided by said second function generator for input to said shift register.

21. The invention of claim 10 including a clock circuit for providing a timing signal to said random data source and to said output port and a counter for dividing said timing signal provided to said output port as compared to said timing signal provided to said random data source.

22. A method of generating a sequence of bits including the steps of:
   providing successive bits of random data to an input port of a shift register, said shift register having a feedback loop;
   selecting either said bits of random data, in a first mode of operation, or said feedback loop, in a second mode of operation, for input from said input port to said shift register;
   operating in said first mode of operation as each successive bit of random data is provided and otherwise operating in said second mode;
   providing a sequence of bits at an output port of said shift register by sequentially providing the bits stored in said shift register.

23. The invention of claim 22 wherein said step of selecting said feedback loop includes applying a first function to the data bits stored in said shift register before input to said shift register.

24. The invention of claim 23 wherein said step of applying a first function comprises applying a logic function to a combination of the data bits stored in said shift register and at least one of said successive bits of random data.

25. The invention of claim 22, wherein said step of selecting said bits of random data includes applying a second function to a combination of the successive bits of random data and the output of said step of applying a first function before input to said shift register.

26. The invention of claim 22 wherein the step of providing a sequence of bits at an output port includes applying a logic function to the bits stored in said shift register before providing the bits at an output port.

* * * * *